United States Patent [19]

Ferrentino

[11] 3,854,698
[45] Dec. 17, 1974

[54] DEVICE WITH ADJUSTABLE TURN-SHIFTING BLADES FOR LAYING OR RECOVERING SUBMARINE CABLES

[75] Inventor: Antonio Ferrentino, Monza, Italy

[73] Assignee: Industrie Pirelli Societa per Azioni, Milan, Italy

[22] Filed: Nov. 8, 1972

[21] Appl. No.: 304,652

[30] Foreign Application Priority Data
   Oct. 24, 1972  France .............................. 72.37625
   Nov. 10, 1971  Italy ................................. 30896/71
   Oct. 29, 1972  Finland ............................. 02698/72

[52] U.S. Cl. ........ 254/190 R, 242/47.01, 242/54 R, 254/175.7
[51] Int. Cl....... B66d 1/36, B66d 3/12, B65h 51/00
[58] Field of Search.............. 242/157.1, 158, 86.62, 242/86.08, 86.61, 157, 78, 47.12, 47.13, 47.01, 47.08, 47.09; 254/175.7, 175.5, 190 R, 134 SC

[56] References Cited
UNITED STATES PATENTS
3,703,090  11/1972  Rosen ......................... 242/47.12 X
3,737,112  6/1973   Tellerman et al............ 242/47.12 X FOREIGN PATENTS OR APPLICATIONS
1,213,717  4/1960  France ...................... 254/134.3 SC
289,974    5/1928  Great Britain ..................... 242/78
578,742    6/1933  Germany ........................ 242/47.12

Primary Examiner—Henry K. Artis
Assistant Examiner—John M. Jillions
Attorney, Agent, or Firm—Brooks Haidt & Haffner

[57] ABSTRACT

A revolving drum for receiving moving cable is provided with one or more blades for shifting successive turns of cable along the axial dimension of the drum as the cable is played out or wound up. The turn-shifting blade is inclined with respect to the direction of the incoming cable, and preferably both the angle of inclination and the axial position of the blade are adjustable. Sliding and pivoting blade motions are fluid activated. Smooth, even windings of cable are distributed along the drum by the blade or blades without damage to the cable.

5 Claims, 8 Drawing Figures

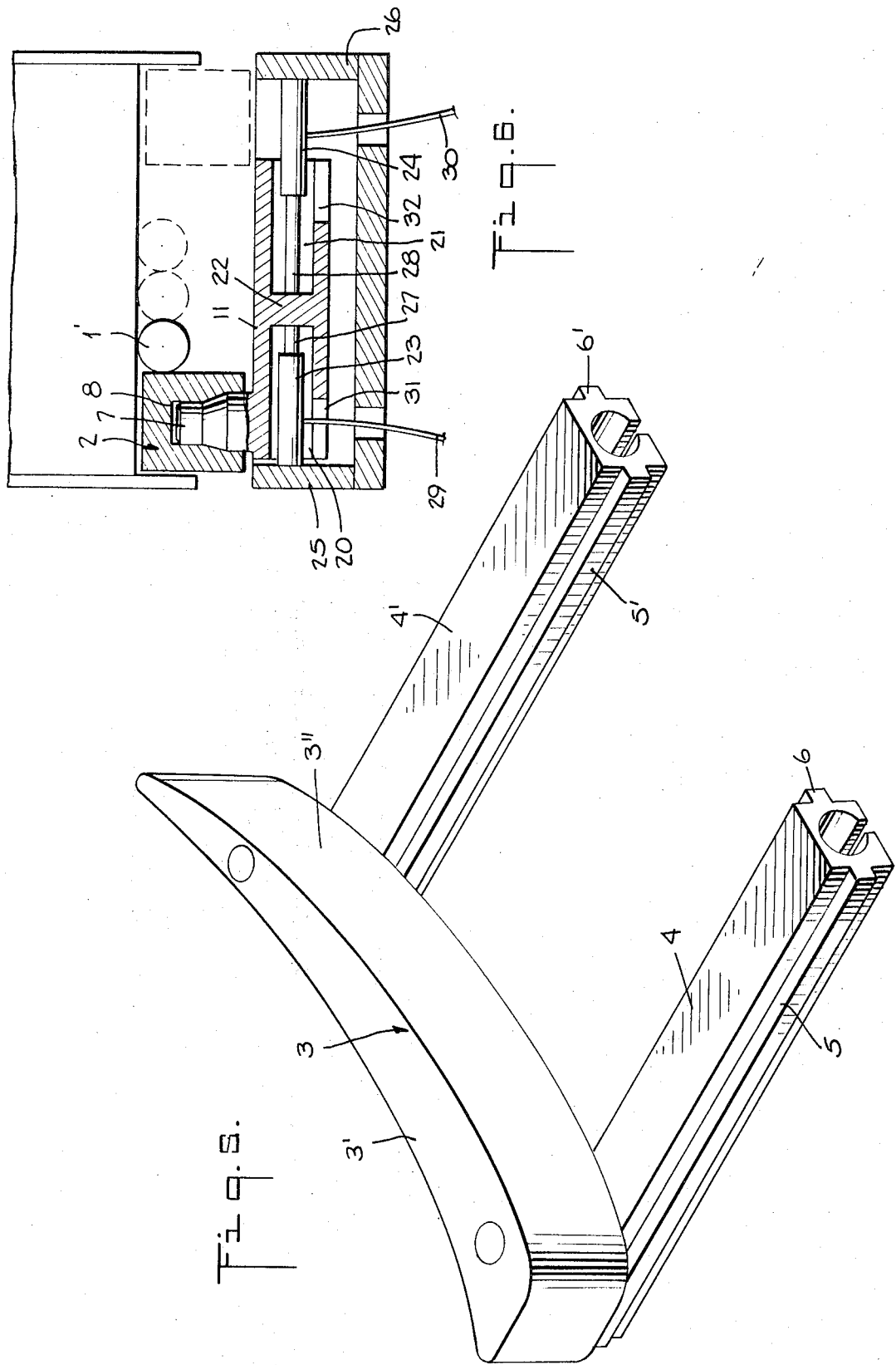

DEVICE WITH ADJUSTABLE TURN-SHIFTING BLADES FOR LAYING OR RECOVERING SUBMARINE CABLES

BACKGROUND OF THE INVENTION

1. Field of the Invention

The present invention relates to winding cables, especially in laying and recovering submarine electric cables, and more particularly, it concerns a device for axial displacement of turns of cable as a cable is laid out from or wound up about a revolving drum.

2. Description of the Prior Art

Submarine cables, in particular power cables, have a considerable weight. During the laying of such cables, the weight of the cable is an important factor, because of the distance between the ship and the sea-bottom. The capstan conventionally provided on a ship for cable laying operations is thus subjected to great braking torques as a cable is laid.

Similarly, when a cable is to be recovered, for instance to repair it, the capstan must be able to withstand the torques resulting from the weight of the cable being lifted.

For these reasons, such cables have generally been wound up in one or more turns about a revolving drum, which can be either driven or braked, depending upon whether the cable is being laid or recovered.

Since the positions of the incoming or outgoing cable are fixed in space, regular winding of cable turns could be made on a drum of infinite axial length by simply moving the drum axially with respect to the fixed point of arrival or departure of the cable. Because such an infinitely extended drum is impossible, devices have been provided to shift the turns of cable in an axial direction with respect to the drum, in such a way as always to leave a free zone on the drum for winding up of incoming cable.

On such device consists of a ring arranged around the drum. The axis of the ring is inclined with respect to the axis of the drum in such a manner that a point situated on the ring periphery is displaced with respect to its diametrically opposite point, by a distance at least equal to the cable diameter. When such a ring is used, cable being reeled in by the rotation of the drum meets the ring surface and is gradually pushed in an axial direction by the ring, leaving free space on the drum for the next cable turn.

After prior art device comprises fixed elements known as "turn-shifting blades." A turn-shifting blade has a body portion in the form of a cylindrical surface parallel to the drum and a cable-contacting portion, hereinafter called "profile," in the form of a surface which does not lie on a plane orthogonal to the drum axis. The profile portion of the blade lies on a plane inclined with respect to said orthogonal plane for shifting the turns along the drum axis as the drum turns. The displacement of each turn caused by the blade should be one diameter of the cable itself. In this way, each turn wound up on the drum is deviated in axial direction so as to leave room for the incoming cable. When two blades are used instead of one, for example by locating one blade after the other, the profile of each blade displaces the cable turns axially by one half of the cable diameter.

However, a disadvantage of prior art turn-shifting devices such as those cited above results from the fact that the cable, owing to its rigidity, has a tendency not to be exactly matched by the profile of the blade. The tension imparted to the cable, of the order of some tons, causes considerable friction forces where the cable turns engage the drum, and such friction forces have to be overcome by the turn-shifting blade. If the profile of the blade does not have the correct inclination, frictional forces give rise to a distribution of pressure tending to concentrate on a limited portion of the blade profile, resulting in damage to the material inside the cable.

Moreover, any set inclination of a prior art turn-shifting blade profile is right only for a certain diameter cable and for a stated friction coefficient between the cable and the drum. Accordingly, turn-shifting blades having a fixed inclination do not give completely satisfactory results.

SUMMARY OF THE INVENTION

The present invention provides a device for laying or recovering a cable by means of a driven or braked revolving drum on which the cable is wound up in one or more turns. In accordance with the invention, the drum is provided with one or more turn-shifting blades to push and to shift the cable turns in an axial direction with respect to the drum. The turn-shifting blades of the invention have a profile inclined with respect to the line defined by the direction of the cable coming on to the drum, and means cooperate with the blades for pivotally rotating the blades in order to vary said inclination.

The present invention will be better understood from the following detailed description, made by way of non-limiting example with reference to the attached drawings.

BRIEF DESCRIPTION OF THE DRAWINGS

In the accompanying drawings, in which like reference numerals designate like parts:

FIG. 5 is a perspective view of a blade provided with slides according to the invention;

FIG. 6 is a view in cross-section of the control unit of a slide taken along line VI—VI of FIG. 4 and looking in the direction of the arrows;

DETAILED DESCRIPTION OF A PREFERRED EMBODIMENT

Figure 1:
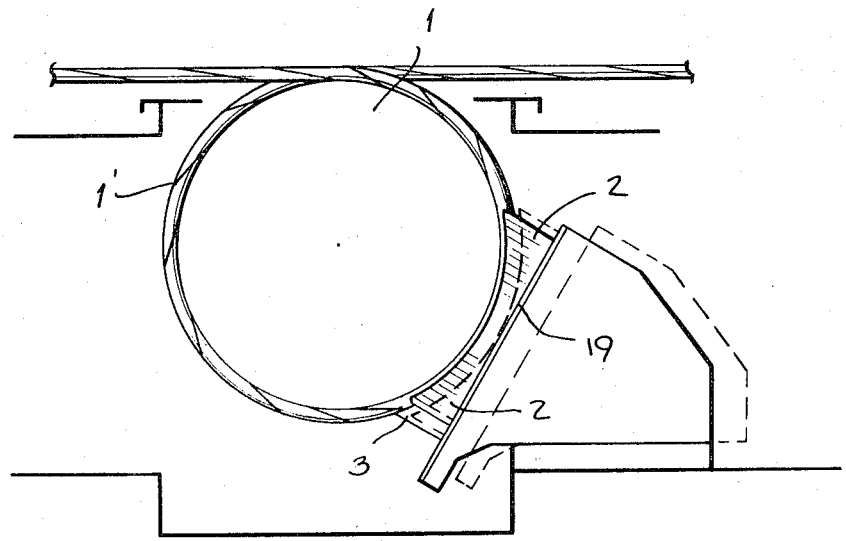
FIG. 1 is a side view of a drum provided with the device of the invention.
Figure 2:
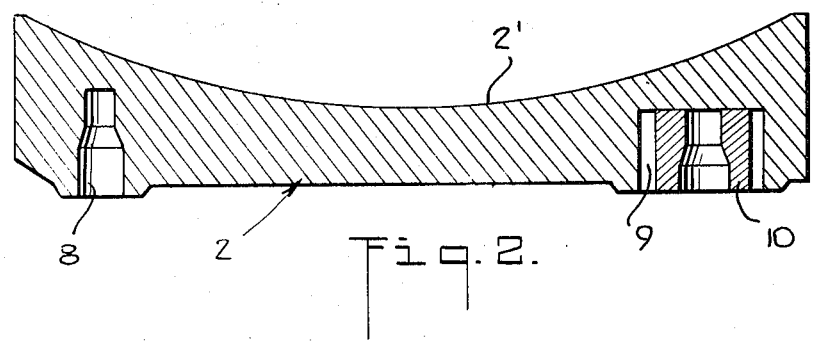
FIG. 2 is a view of a blade according to the invention.

The device of the present invention can suitably be situated on a main deck of a cable-laying ship (not illustrated in the drawings), and, as shown in FIG. 1, comprises a revolving drum 1 and turn-shifting blades generally indicated by the reference numerals 2 and 3.

The revolving drum 1 can be either driven or braked depending on whether the cable is to be recovered or laid. The cable is stored in coils in the ship's hold and is directed towards the drum 1, the cable being wound up in one or more turns about the drum 1 with its outgoing end extending toward the cable laying direction.

Figure 7:
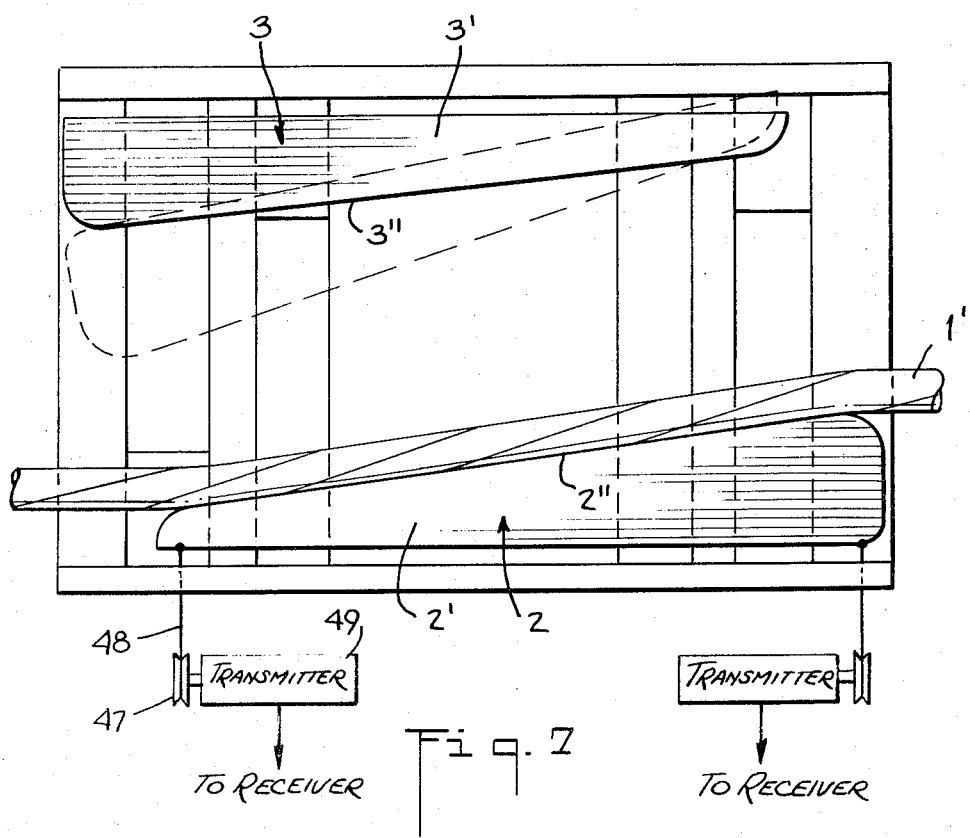
FIG. 7 shows the relationship of two blades with respect to the drum axis and shows an adjusted blade position in dashed lines.

The blades 2 and 3, one for the laying operation and the other for the recovering operation, have curved portions 2' and 3', respectively (see FIGS. 2, 4, 5, 7), as well as portions 2'' and 3'', respectively, which are shaped according to a profile. The profile portions 2'' and 3'' are inclined with respect to a line defined by the direction of the incoming cable 1' on the drum 1 as shown in FIG. 7. The inclined profile serves for pushing and shifting cable turns in a direction axial to the drum 1, itself.

In order to support uniformly the thrust exerted in the blades 2 and 3 by the cable, means are provided not only to rotate the blades 2 and 3 in such a way as to vary their inclination, but also to shift the blades 2 and 3 in an axial direction with respect to the drum 1. The adjusting means for the blades 2 and 3 will be described with reference to a particular embodiment illustrated by way of examples. Basically, the adjustment means are thrust elements applied to the ends of each blade. Each of these elements comprises at least a first and a second slide and a control unit for the actuation of such slides.

The several slides are all of the same size and shape. The typical slide 4 as shown in FIG. 5 has the shape of an elongated parallelepipedon and has two lateral guides 5 and 6 extending along opposite sides of the slide for sliding motion on appropriate rails formed by fixed parts of the device.

Each slide is pivotally joined to one end of the blade by means of a hinged connection. Thus, as shown in FIG. 5, the slide 4 is pivotally connected to the narrower end of the blade 3. Similar pivotal slide connections permit movement of the blade 2. At least one of the hinges of each of the blades 2 and 3 can slide for a limited stroke on the direction of the blade length.

In a preferred form of the device of the invention each blade has a fixed hinge and a moving hinge. The slide connected to the blade by a fixed hinge will be designated as the "first slide" and the other slide, connected to the same blade by a moving hinge, will be called the "second slide."

A suitable hinged connection can be made between slides and the blades by providing on each slide, at the slide end adjacent the blade, an upstanding connection pin 7, which is inserted in a cavity 8 or a cavity 9 found in the blade. Cavities 8 and 9 are shown in the blade 2 in FIGS. 2 and 3.

Cavity 8 (see FIGS. 2, 3 and 4) directly receives the connecting pin 7 of the first slide for pivotal motion about the pin, whilst cavity 9 is connected to the connecting pin 7 of the second slide through an articulation 10. The element 10 is a block-like member, slidably received in the cavity 9, the cavity 9 being somewhat longer than the member 10. The inner surface of cavity 8 thus has a shape complimentary to that of the outer surface of the connecting pin 7. Cavity 9 has two sliding side surfaces 9' and 9'' for articulation 10.

Figure 4:
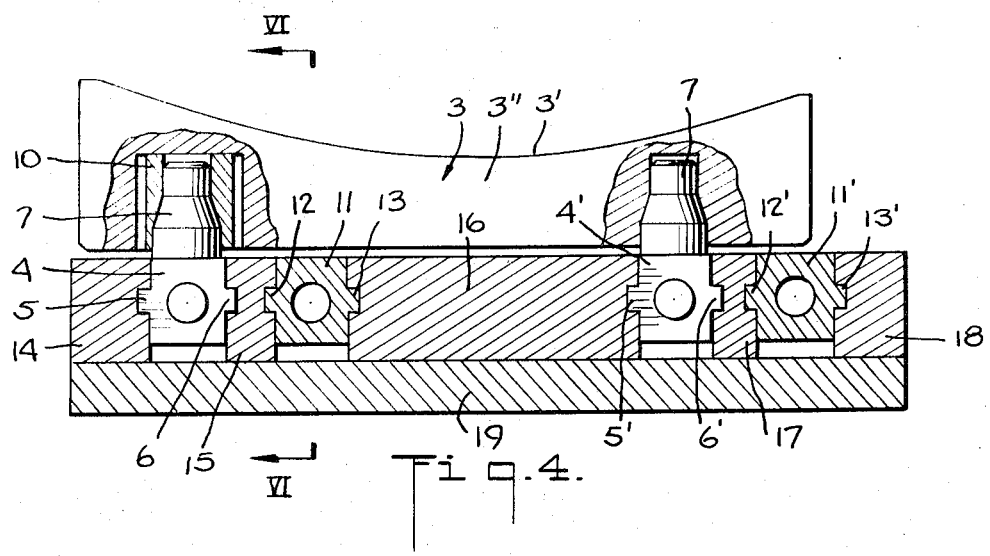
FIG. 4 is a view in longitudinal section taken between the blades shown in FIG. 1.

As already said, the slides, actuated by a control unit which will be described hereinafter, slide with their guides on rails formed by fixed parts; in this connection, FIG. 4 represents blade 3, connected at one end of its ends by a fixed hinge to its first slide indicated by reference numeral 4', and connected at its other end by a movable hinge to its second slide 4.

FIG. 4 also illustrates the two slides 11 and 11' of blade 2, more precisely the first slide 11 with its lateral guides 12 and 13, and the second slide 11' with its lateral guides 12' and 13'.

The guides of the slides travel on rails formed by fixed parts indicating at 14, 15, 16, 17, and 18. The rails are preferably in the form of laterally grooved members as shown. The rails 14–18 may suitably be mounted on a supporting plate 19 by conventional fasteners such as bolts.

The plate 19, with an appropriate supporting fixture, is preferably mounted for movement along a ship's deck, as shown in dotted lines in FIG. 1. The movement of plate 19 permits the initial insertion of the cable around the drum 1, and the disengagement of turns of cable unhampered by the blades 2 and 3. At other times, the plate 19 and its support can be locked in place.

The control unit will now be considered. It is comprised of cylinders and cooperating pistons fitted in the cylinders, whose actuation causes the displacement of the slides along directions parallel to the drum axis. The control unit is of the hydraulic fluid actuated type, preferably using a suitable oil as the hydraulic fluid.

To better illustrate the control unit of each slide, reference is made to FIG. 6, which is a cross-section of FIG. 4. This figure shows the first slide 11 pivotally joined by a fixed hinge to the end of blade 2 by means of the connecting pin 7 of the slide itself, the pin 7 being received in the cavity 8 of the blade.

The slide 11 is provided internally with two seats 20 and 21 of circular section. The outer ends of similar seats appear in the slides 4 and 4' of blade 3 in FIG. 5. The inner ends of the seats 20 and 21 are separated by a partition 22. Inside the seats 20 and 21 there are respective cylinders 23 and 24 abutting at their outer ends against fixed walls 25 and 26, respectively. A piston 27 of cylinder 23 and a piston 28 of cylinder 24 act on the partition wall 22 of the slide, as the pistons are actuated by the fluid supplied to each cylinder by pipes 29 and 30. Moreover, the slide is provided with two slits 31 and 32 to prevent it from interfering with pipes 29 and 30 during its motion.

The operations for carrying out the axial displacement and the variation in the inclination of the blade profile will now be described.

FIG. 6 shows the blade 2 at one extreme position, i.e., at the left end of the stroke of its slides. When it is desired to move the blade 2 axially of the drum nd parallel to itself, fluid under pressure is sent to both cylinder 23 of slide 11 and to the corresponding cylinder, not illustrated, of the second slide. At the same time, fluid is discharged from cylinder 24 and from the corresponding cylinder, not shown, of the second slide situated at the other end of blade 2. In this way, the piston 27 of the first slide and the corresponding piston of the second slide are thrust against the walls 22 of the first and second slides, with a resulting axial displacement of the blade 2 which would be to the right in FIG. 6. When it is wished to vary the inclination of the profile of one of the blades, only one of the slides connected to the blade is actuated. For instance, to vary the inclination of the profile of blade 2, fluid under pressure is not sent to slide 11, but only to the second slide 11', which is connected by a moving hinge to the opposite end of blade 2.

FIG. 4 does not illustrate blade 2 and its connections with its slides, but it does show the analogous connections for the blade 3.

Figure 3:
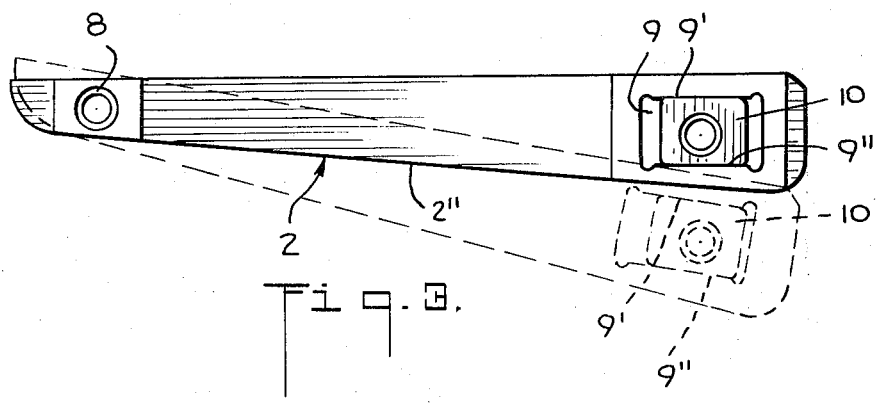
FIG. 3 is a view taken from below of the blade in FIG. 2.

By charging fluid under pressure into a cylinder of the second slide 11', of the blade 2, and by discharging fluid from the other cylinder, the slide carries out both rotational and axial movement with respect to the drum 1 (as shown by dotted lines in FIG. 3). The thrust received by the second slide originates the rotation of blade 2 about the fixed hinge situated at the opposite end of the blade and causes the lateral walls 9' and 9'' of cavity 9 to slide on articulation 10 which will rotate with respect to the initial position the same extent as the rotation of the blade 2.

FIG. 7 represents in dotted lines the rotation of blade 3, when it is wished to vary the inclination of its profile. This is accomplished as described above with respect to blade 2.

The device is also provided with means for measuring the intensity of the thrust exerted by the thrust elements on each slide of the blade.

As already explained, the cable is subjected to a considerable tension and in order axially to displace the turns of cable on the drum, the blade must overcome the friction forces generated by the engagement between the turns and the drum.

To ascertain whether the reaction to said friction forces is uniformly distributed on the profile of the blade, this reaction can be measured on the hinge pins 7 connecting the blades to their slides. The measurement is done by pressure gauges which reveal the pressure of the fluid in the cylinders of each slide.

Therefore, if after having moved the blade or varied the inclination of the laying blade 2 or the recovering blade 3, the reading on a pressure gauge connected to the fluid supply pipe of the first slide of the blade is different from the reading on a pressure gauge connected to the fluid supply pipe of the second slide of the blade, the readings of the two pressure gauges can be made equal to each other by imparting a different inclination to the blade profile so that the resultant force of the reactions to the friction forces passes through the midline of the blade profile; in this way, the distribution of the pressures can be made as uniform as possible.

Figure 8:
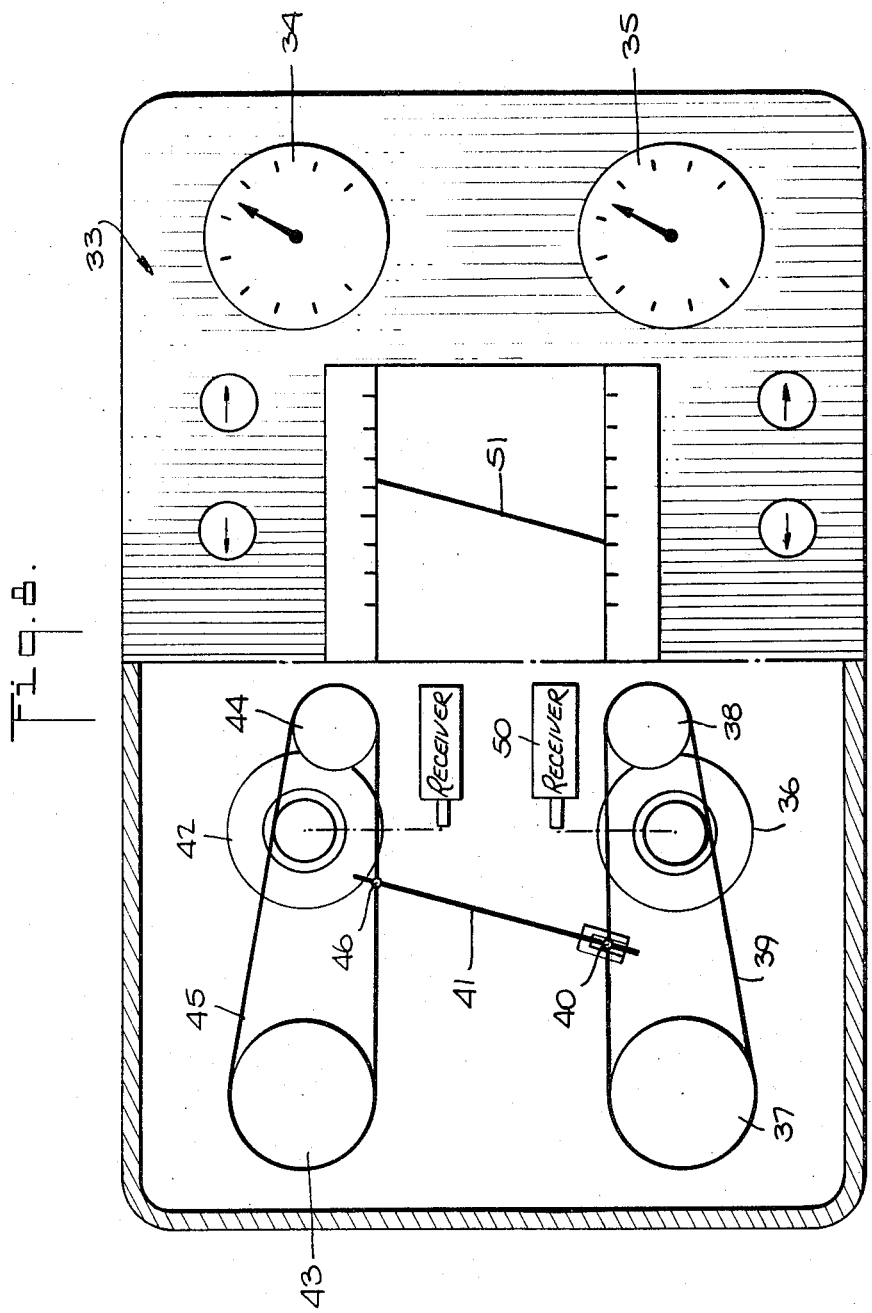
FIG. 8 shows a preferred control board according to the invention.

A control board 33, shown in FIG. 8, is preferably situated on the ship's deck. The control board 33 carries pressure gauges 34 and 35 which indicate directly the thrust existing at the end of each blade.

The control board of the invention also shows other information concerning the blades by means of indicators connected with elements sensitive to the displacement of the blade ends. These indicators on the board show blade position and the inclination of the blades' profile. The control devices are preferably grouped on a single board as shown to allow an easy check to avoid the necessity of vocal transmission from one operator to another of all the data concerning the device in operation.

Knowledge of the position of one blade with respect to the other, for example, the relationship shown in FIG. 7, is necessary because during the laying or recovering operations, only one of the blades is operative, blade 2 in laying and blade 3 in recovery of the cable. Therefore, an excessive displacement of the operative blade could bring the turns of cable into contact also with the idle blade, with consequent damage to the cable.

In an embodiment described by way of example, the position sensitive elements comprise for each slide: a sensing apparatus able to follow the displacements of the blade end; a transmitter receiver unit able to convert the displacements of the slides into movements which can be indicated on the board; and an indicator apparatus provided with a slider and a graduated scale for locating the position of each blade.

The sensing apparatus can simply comprise a pulley 47 connected to the end of the blade by means of a wire 48 (FIG. 7).

The transmitter/receiver can comprise a transmitter 49 coaxial to the pulley 47 of the sensing apparatus and a receiver 50 coaxial to the pulley 36 of the indicator apparatus (see FIG. 8). Similar sensing apparatus and a transmitter/receiver are provided for the other end of the same blade to transmit position indications to the pulley 42, and for the other pulleys for the second blade which are hidden behind the right side of the panel 33 and which control the position of the slider 51. Other suitable arrangements could be made.

The indicator apparatus comprises the above cited pulley 36, two wheels 37, 38 and a wire 39 looped once completely about pulley 36 and running along an arc about the wheels 37 and 38, thus forming a closed circuit. The end 40 of a slider 41 is secured to the wire 39. The above-described elements used for the first slide of a blade, are duplicated by analogous elements for the second slide of the same blade. Thus, for the second slide in FIG. 8, a pulley 42, two wheels 43 and 44, a wire 45 and the end 46 of the slider 41 are clearly shown. The cut away left side of FIG. 8 shows the mechanisms for indicating the position of blade 2.

The slider 41 slides with its ends 40 and 46 in front of two graduated scales, as shown at the right hand side of FIG. 8 for the slider of the blade 3. The internal parts are the same for the indicators for both blades. Each graduated scale indicates the percentage, with respect to the total available stroke, of the axial displacement carried out by the end of a blade.

The operation of a suitable transmitter/receiver unit will be understood by those familiar with the art since such a unit can be analogous to that of any unit employed for the remote transmission of angular positions, in our case the angular position of the pulley of the first apparatus to that of the second apparatus in the board.

When a correction is made in the position of the blade, the displacement of the end of said blade is transmitted to the corresponding pulley of the control board, owing to the action of the first sensing apparatus and of the transmitter/receiver unit described above.

The wire (for instance the wire 39), which is wound up about the pulley 36, is moved and drags end 40 of the slider to slide on the graduated scale, thus giving a percentage indication of the axial displacement of the blade end.

A further advantage of this device lies in the fact that the operation of the blades can be completely and easily controlled directly from the board, it being unnecessary to make use of intermediate signals.

Although some embodiments of the invention have been described and illustrated in detail, it should be understood that the invention includes any other alternative embodiments deriving from the above indicated inventive concept and that numerous modifications and alternative arrangements will suggest themselves to those of ordinary skill in the art within the spirit and scope of the invention.

What is claimed is:

1. In a device for laying or recovering cable comprising a driven or braked drum revolvable about a predetermined axis and having a peripheral surface on which one or more turns of cable are wound, the combination therewith of mounting means adjacent said peripheral surface of said drum, said mounting means being adjustable toward and away from said peripheral surface, at least one turn-shifting blade, adjustable means mounting said blade on said mounting means adjacent said peripheral surface and with a surface of said blade facing in the direction of said axis and engageable with a portion of a cable on said peripheral surface for shifting said portion in the direction of said axis of said drum, said blade having opposite ends and a length therebetween which is less than the peripheral dimension of said peripheral surface, said blade being disposed with said ends spaced from each other in a direction circumferentially of said axis and said surface of said blade being substantially continuous between said ends and being inclined with respect to a plane orthogonal to said axis, said adjustable means comprising supporting means on said mounting means pivotally supporting said blade and movable with respect to said mounting means in the direction of said axis whereby the inclination of said surface of said blade with respect to said plane may be varied by moving said supporting means in the direction of said axis, said supporting means comprising a pair of means, one engaging a first portion of said blade and the other engaging a second portion of said blade spaced from said first portion thereof in the direction of the spacing of said ends of said blade, both of said pair of means being movable with respect to said mounting means in the direction of said axis, and a pair of thrust elements on said mounting means, one said element acting between said mounting means and one of said pair of means and the other said element acting between said mounting means and the other of said pair of means, each of said thrust elements comprising a fluid actuatable cylinder and piston means and said pair of means being a pair of slides slidable on said mounting means in the direction of said axis whereby said slides and hence said blade may be moved in the direction of said axis by actuation of said cylinder and piston means.

2. The device as set forth in claim 1, further comprising transmitting means connected to said blade and responsive to the position thereof and indicating means located remotely from said mounting means and connected to said transmitting means for remotely indicating the position of said blade.

3. The device as set forth in claim 2, further comprising controlling means mounted adjacent said indicating means and connected to said thrust elements for actuating the latter and thereby changing the position of said blade.

4. The device as set forth in claim 1, wherein one of said slides is pivotally connected to said blade at one of said ends of the latter and the other of said slides is pivotally and slidably connected to said blade at the other of said ends of said blade.

5. The device as set forth in claim 1, further comprising pressure gauges connected to said cylinder and piston means for measuring the thrust exerted by said cylinder and piston means on said slides and hence, on said blade.

* * * * *

UNITED STATES PATENT OFFICE
CERTIFICATE OF CORRECTION

Patent No. 3,854,698           Dated December 17, 1974

Inventor(s) ANTONIO FERRENTINO

It is certified that error appears in the above-identified patent and that said Letters Patent are hereby corrected as shown below:

| Col. 1, line 39 | "On" should read --One-- |
| Col. 1, line 49 | "After" should read --Another-- |
| Col. 4, line 8 | "indicating" should read --indicated-- |
| Col. 4, line 52 | "nd" should read --and-- |

Signed and sealed this 18th day of February 1975.

(SEAL)
Attest:

RUTH C. MASON
Attesting Officer

C. MARSHALL DANN
Commissioner of Patents
and Trademarks